Dec. 5, 1950  E. G. WHITE  2,532,383
WARM AIR LIMIT CONTROL SWITCH
Filed March 20, 1947  3 Sheets-Sheet 1
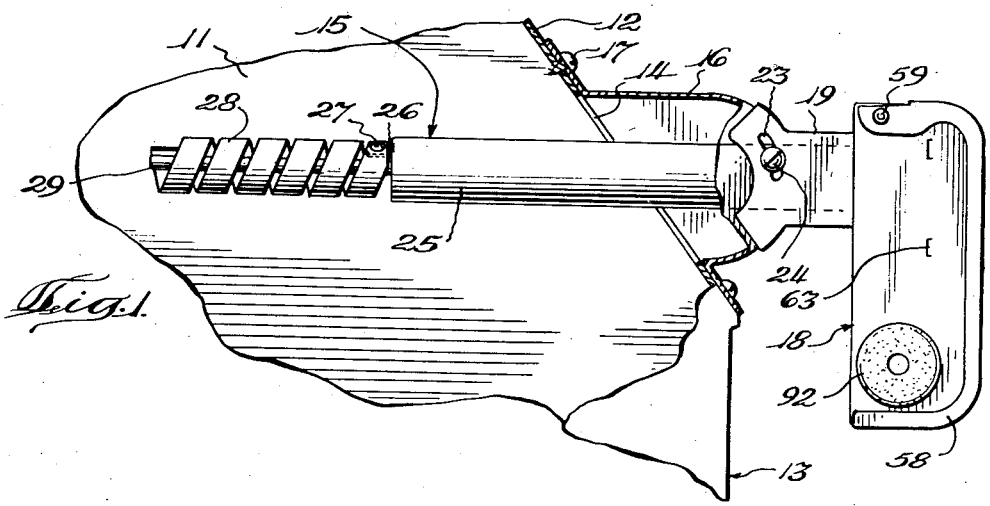
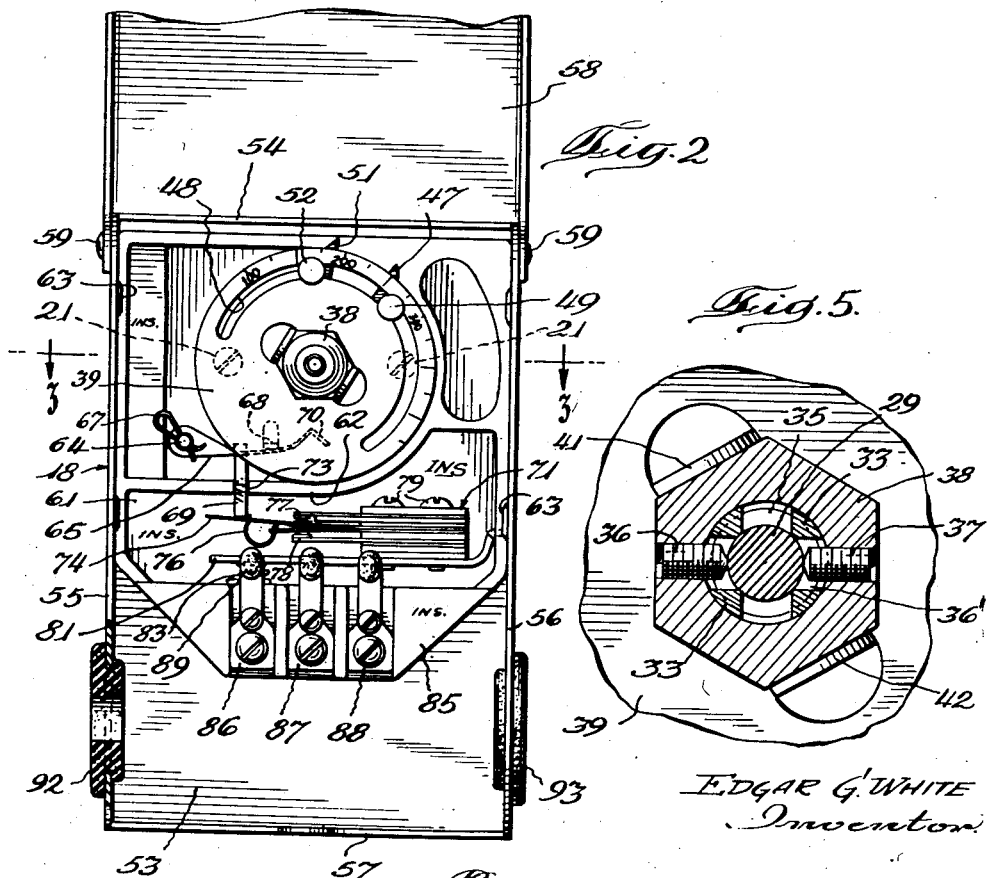
Edgar G. White
Inventor Dec. 5, 1950 — E. G. WHITE — 2,532,383
WARM AIR LIMIT CONTROL SWITCH
Filed March 20, 1947 — 3 Sheets-Sheet 2
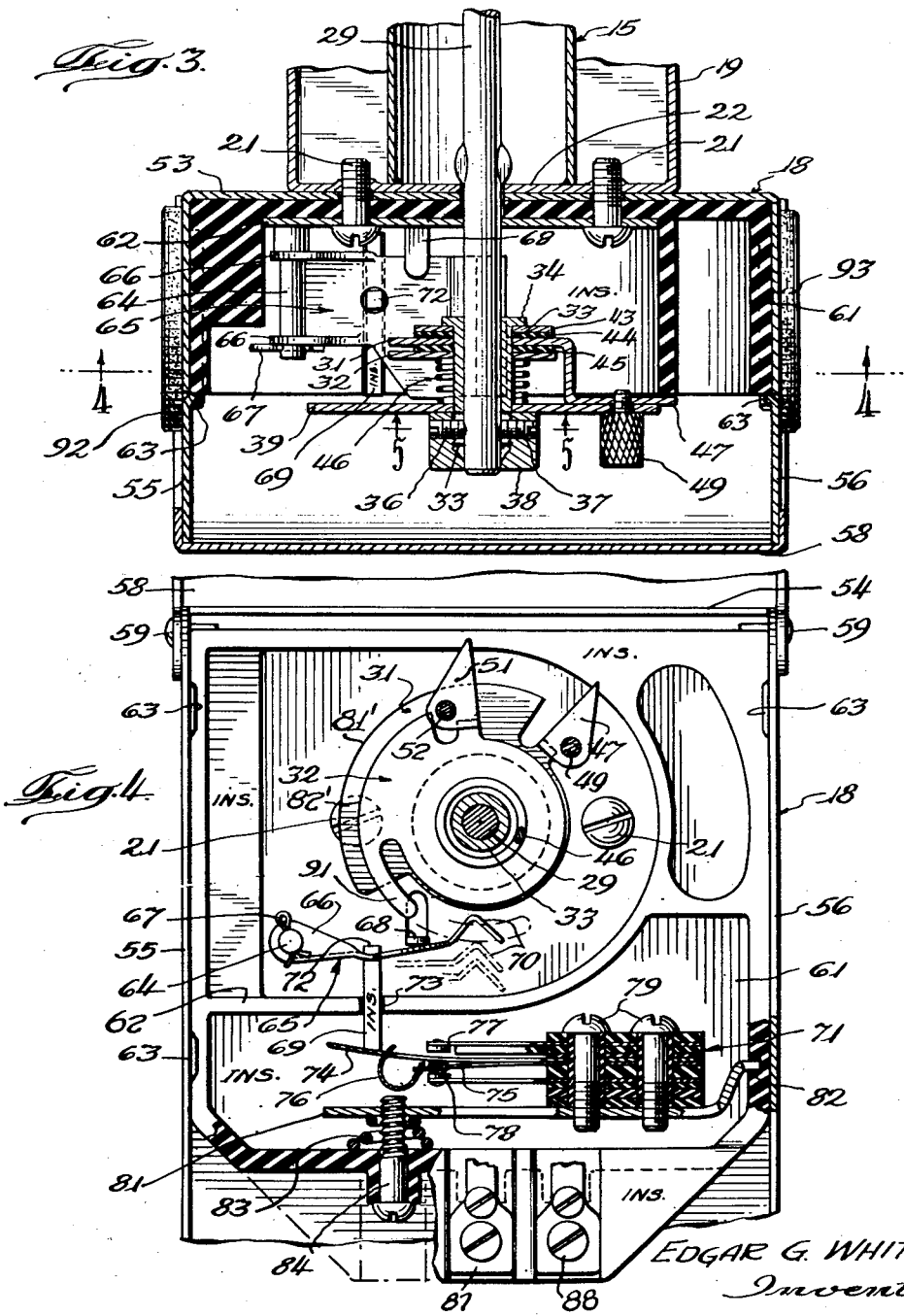

Dec. 5, 1950            E. G. WHITE            2,532,383
WARM AIR LIMIT CONTROL SWITCH
Filed March 20, 1947                            3 Sheets—Sheet 3
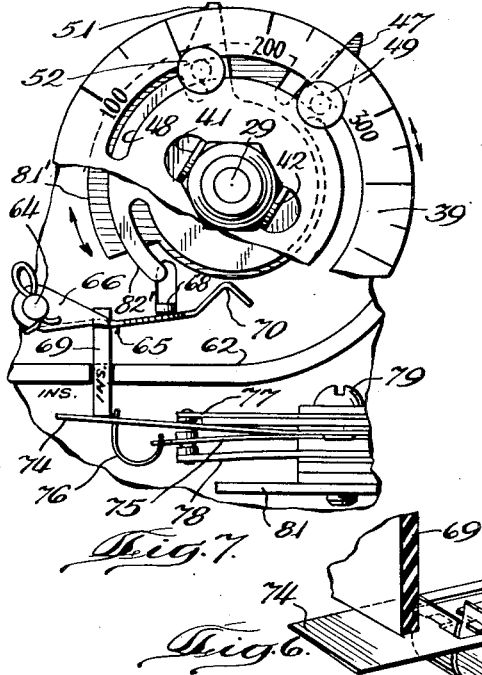
Fig. 7.
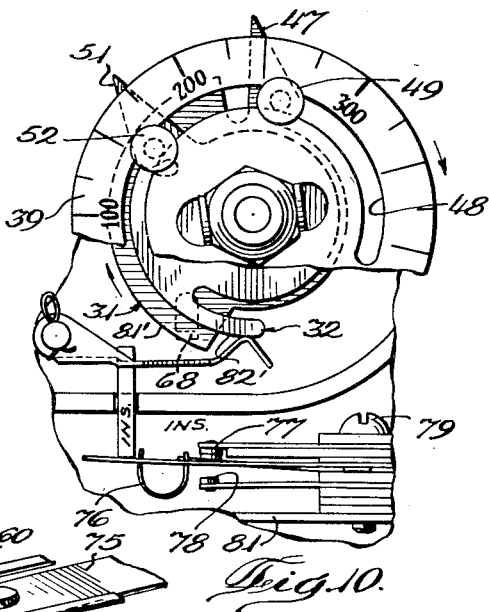
Fig. 10.
Fig. 6.
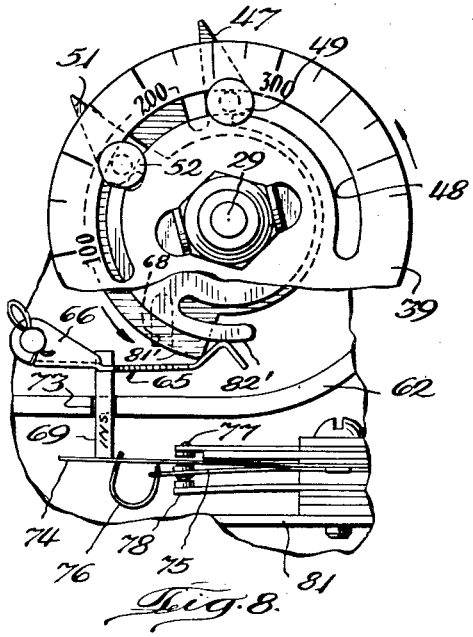
Fig. 8.
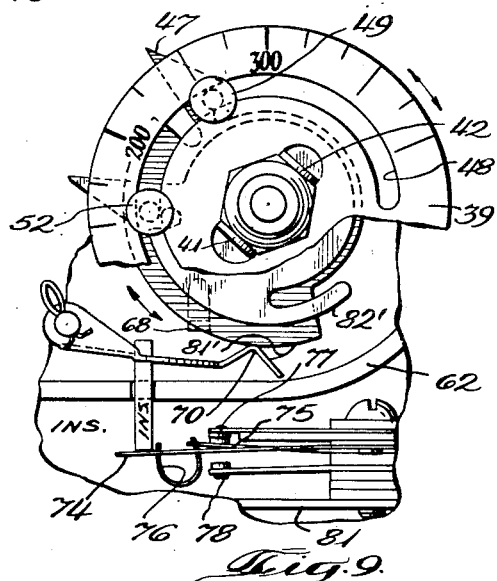
Fig. 9.
Inventor
EDGAR G. WHITE
By
Attorneys Patented Dec. 5, 1950

2,532,383

UNITED STATES PATENT OFFICE 2,532,383

WARM AIR LIMIT CONTROL SWITCH

Edgar G. White, Peru, Ill., assignor to Sampsel Time Control, Inc., Spring Valley, Ill., a corporation of Illinois Application March 20, 1947, Serial No. 735,923

1 Claim. (Cl. 200—138)

The present invention pertains to temperature control devices and more particularly to apparatus for maintaining the maximum and minimum temperature ranges in heat bonnets or similar devices.

The principal object of the invention is to provide instrumentalities for insuring continuous heat supply at an even temperature level.

Another object of the invention is to provide an efficient and reliable heat regulator adaptable to control under a plurality of conditions of operation.

A still further object of the invention is to provide a system of heat control whereby the supply of heat in response to a call therefor under the control of a room thermostat is expedited by a fan control arrangement in the furnace bonnet, wherein the duration of fan operation is adjustable between any two predetermined temperature levels.

Specifically, the heat control means according to the present invention comprises a heat responsive unit mounted on the furnace and adapted to project inwardly into the bonnet or hot air chamber thereof, where the temperature changes in the bonnet act upon a coiled bimetallic heat responsive element. The effect of said heat responsive element upon a pair of control contacts is determined by a pair of adjustably related cam discs whose cam contours are rotatably settable manually to govern the on and off conditions of a fan located in the furnace bonnet.

A feature of the invention resides in minimizing the danger of overheating the furnace due to prolonged calls for heat. To prevent excessive heating, the air in the bonnet upon reaching a predetermined temperature initiates a heat dissipating fan into operation, which continues to operate to eject the heated air from the bonnet until a predetermined lower temperature is reached. While the fan is thus operating within the predeterminedly adjusted range a further control suspends operation of the firing apparatus. If, upon reaching the lower level of the range at which the control unit of the present invention is adjusted, the room thermostat is still calling for heat, the firing controls of the furnace will be again opened to increase the heat in the bonnet. If, on the other hand, the temperature called for by the room thermostat is attained, the room thermostat assumes control and the firing controls of the furnace remain closed.

A better understanding of the foregoing objects and features of the invention will be had from the following description when taken in conjunction with the accompanying drawings. wherein, Fig. 1 is a sectional view illustrating the application of the heat control unit according to the present invention to the bonnet or warm air chamber of a warm air furnace or similar central heating unit;

Fig. 2 is a front elevational view of the heat control unit of the present invention with the cover raised;

Fig. 3 is a sectional view taken on line 3—3 of Fig. 2;

Fig. 4 is a sectional view taken on line 4—4 of Fig. 3;

Fig. 5 is a fragmental sectional view of the connection between the adjustable cam elements and the heat responsive element;

Fig. 6 is an enlarged perspective detail view of a contact operating blade and over-centering spring therefor; and Figs. 7 to 10 are a series of enlarged fragmentary elevational views of the adjustment index and contact apparatus featuring various conditions of operation.

Referring to the drawings wherein the same reference characters identify the corresponding parts throughout the several views, and having particular reference to Fig. 1, the hot air chamber 11 is enclosed by the bonnet 12 of the furnace or warm air heating unit 13. An aperture 14 is provided in the bonnet 12 through which a heat responsive element, generally indicated as 15, is projected into the chamber 11. Mounted over the aperture 14 is a canopy 16 which is secured to the bonnet 12 by screws 17. The canopy 16 is, in turn, provided with a semi-cylindrical foreportion upon which a cap 19 is saddled for radial adjustment. The heat responsive element 15 is associated with the control switch receptacle 18 in a manner to be presently described.

The cover member or cap 19 is held fast to the receptacle 18 by means of screws 21 (Fig. 3) which thread into portion 22 of the member 19 which is disposed between the element 15 and the receptacle 18. The cap 19 is semi-cylindrically conformed to fit over the corresponding portion of the canopy 16 so as to be adjustably slidable thereover, whereby the angularity of the element 15 with respect to the bonnet 11 may readily be adjusted within the limits afforded by the slot 23 in cap 19 and secured by clamp screw 24 in canopy 16.

The heat responsive element 15 comprises a tubular housing portion 25, the outer end of which is welded or otherwise secured to the web 22. The inner end of tubular portion 25 is provided with a projecting lug 26 to which is attached by means of a screw 27 one end of a spiral bimetallic strip 28, the other end of which is secured to the inner extremity of a control rod 29. The outer end of rod 29 projects into the receptacle 18 and supports the adjustable cam discs 31 and 32 which, as will appear hereinafter, perform the dual functions of limiting the warm air temperature level in the bonnet of the furnace to supervise the control of the firing mechanism of the furnace, and regulate the operation of a fan located in the furnace bonnet.

The manner of mounting the cam discs 31 and 32 is shown in Fig. 3. Carried on rod 29 is a sleeve 33 having a flange 34. As indicated in Fig. 5, the sleeve 33 is provided with a pair of intersecting slots 35 and 36' to receive a pair of set screws 36 and 37 mounted in a nut 38 (hexagonal in the present embodiment) threaded onto the end of the sleeve 33. A dial in the form of a disc 39 is mounted on the sleeve 33 and is provided with a pair of transversely disposed ears 41 and 42 struck out of the body of the disc 39 and adapted to straddle an opposite pair of faces of the nut 38.

Cam discs 31 and 32 are carried on the sleeve 33 while positioned between the flange 34 and cam 31 is a friction clutch disc 43 and a packing disc 44 of resilient material. Another disc 45 of resilient material is positioned between cams 31 and 32. A coiled compression spring 46 is disposed between cam 32 and the disc 39 to compress the cam discs 31 and 32 and discs 43, 44 and 45 against the flange 34, as well as to hold the dial 39 in registry with the nut 38.

The cam disc 31 has integral therewith an index or pointer 47 which may be secured to the dial 39. The dial 39 is provided with an arcuate slot 48 (Fig. 2), and the pointer 47 is threaded to receive a knurled clamping nut 49. The cam disc 32 is similarly provided with an index or pointer portion 51 which is similarly secured to the dial 39. Pointer 51 is threaded to receive a knurled clamping nut 52.

The receptacle or box 18 includes a back wall 53 and sides 54, 55, 56 and 57. A lid 58 is pivoted to the receptacle 18 at pivots 59. Mounted within the receptacle 18 is an insulation block or base structure 61 through which the rod 29 passes and which supports the instrumentalities now to be described. As shown in Fig. 3, the structure 61 is secured to the receptacle 18 by means of screws 21, which screws also function to hold a metallic plate 62 in place.

Projecting from plate 62 is a stud shaft 64 which supports a cam follower arm 65 whose inverted V extremity is adapted to engage the peripheries of both cam discs 31 and 32. Cam follower 65 is rockably supported on stud shaft 64 by means of flanges 66 and retained thereon by a cotter pin 67. An ear 68 is pressed out of plate 62 to provide an up-stop or limit for cam follower 65.

The cam follower 65 functions through an interponent 69 to operate a switch assembly, indicated generally 71. The interponent 69 is articulated to the follower 65 by means of a projection 72 fitted into a suitable notch in said follower and is guided within a slot 73 formed in the wall 62 of block member 61. The interponent 69 is preferably a floating block of insulation material and functions as a thrust bar between the pivoted follower lever 65 and a flexing spring 74 (see also Fig. 6). The center portion of the flexing spring is cut-away as at 60 to afford a clearance for the double acting contactor 75, while between the two there is disposed a horseshoe over centering spring 76. When the flexing member is thrust downwardly to a sufficient extent, the horse-shoe spring 76 passes a median position of flexure and thereafter its opposite end thrust upwardly against the contactor 75 moving the latter into engagement with the upper contact point 77. Conversely, when the flexing member 74 moves upwardly, as is its natural biased position, the over-centering horse-shoe spring 76 reverses its action thrusting the contactor 75 downwardly into engagement with the lowermost contact point 78. The tension of flexing member 74 is sufficient to overcome the over-centering spring 76 and to maintain the follower lever 65 in the position indicated in solid lines in Figs. 2, 4, 7 and 10.

The contact elements 75, 77 and 78 are assembled with suitable insulating strips and attached by screws 79 to a switch supporting plate 81. One end of plate 81 is embedded within a niche 82 in the side wall of the base moulding 61. The other end of plate 81 is yieldably supported by means of a spring-loaded screw arrangement comprising an involute spring 83 and a screw 84, Fig. 4.

The bottom portion 85 of base 61 forms a terminal block for contact terminals 86, 87 and 88 which are adapted to be electrically connected to contact elements 75, 77 and 78, the terminals being provided with lugs 89 to which said wires may be soldered (Fig. 2). Insulation ferrules or grommets 92 and 93 are mounted in the sides 55 and 56 of the receptacle 18 to accommodate conductors extending between contact terminals 86, 87 and 88 and the external units to be operated or controlled.

In operation of the temperature control device according to the present invention, dial 39 is calibrated to accord with the characteristics of the heat responsive unit 15, and then secured to rod 29 by means of set screws 36 and 37. The pointers 47 and 51 are set to the proper temperature ranges desired to be the maximum and minimum limits of the bonnet.

As the bimetallic coil 28 is heated and cooled, alternate clockwise and counter-clockwise rotation is imparted to rod 29, which rotation is transmitted to the dial 39 and to cams 31 and 32.

The cams 31 and 32, each having a concentric apex section $81^1$ and $82^1$ respectively with the cam 31 being of longer radius than cam 32 and both acting upon the follower nose or V portion 70 of the lever 65. When the heat in the bonnet is increasing, the effect upon coil 28 is such as to rotate the rod 29 in a counter-clockwise direction as viewed in Figs. 7 to 10, while when this heat is diminishing it will rotate rod 29 in a clockwise direction. In the condition indicated in Figs. 4 and 7 the cams 31 and 32 are shown in a position which they would assume when the bonnet is relatively cool or in low temperature level, cams 31 and 32 having advanced in a clockwise direction to a condition where both of the apices thereof have over-passed follower projection 70. In so progressing clockwise projection 70 has ridden off of the cam apex 81' onto the tail 91 or cam apex 82' of cam 32 and thereafter has ridden off of cam 32 responding to the normal bias of flexing member 74.

Attention will now be directed more particularly to Figs. 7 to 10 in which the various conditions of movement on the part of cams 31 and 32 have been revealed with the object of indicating the progress that is made as the temperature in the bonnet fluctuates. For the sake of illustration, a cycle of conditions will be arbitrarily initiated from the point at which, as has already been stated, the bonnet is relatively cool. Cams 31 and 32 assume an extreme clockwise position and both of their apices 81 and 82 have ridden off of the follower projection 70 and the normal tension of spring 74 has raised the insulation plunger 69 and the follower lever 65 to their upper levels, and the over-centering spring 76 has deflected contactor blade 75 so that it engages the lowermost contact 78. Engagement between contactor elements 75 and 78 completes a circuit (not shown) which initiates a firing apparatus, viz., stoker, oil burner or other, and thereupon the heat in the bonnet 13 will begin to rise progressively.

As has already been explained the temperature of the bonnet has the effect upon the bimetallic spiral 28 of rotating shaft 29 in a counter-clockwise direction as viewed in Figs. 7 to 10. After some progress in this direction shaft 29 together with sleeve 33 and all of its carried elements, including the cams 31 and 32, as well as the dial 39 will rotate in a counter-clockwise direction until first of all the apex $82^1$ engages and partially depresses follower lever 65 as best illustrated in Fig. 8.

This amount of movement on the part of lever 65 is predeterminedly inadequate however, to have any effect upon over-centering spring 76, which thus far approaches but has not overtaken its point of over-centering. No change in the relationship of the contactors is therefore made and the heat continues to rise in the bonnet.

Presently apex 81' overtakes the follower 65 which is thereupon depressed farther, and which in turn transmits such motion through plunger 69 to the control spring 74. Soon the over-centering point is reached and the over-centering spring jumps into the position illustrated in Fig. 9 thrusting the double acting contactor 75 away from contactor 78 and into engagement with contactor 77. As a consequence, the firing circuit is broken at 78 and the heat dissipating circuit is established with contact 77 which may have the form of a circulating fan to discharge the heat accumulations within the bonnet. It is to be observed that meanwhile due to the inherent characteristics of central heating apparatus, a certain amount of heat will continue to build up within the bonnet and the shaft 29 will continue in a counter-clockwise direction as a result of this so-called heat over-running characteristic. The present invention has been designed so as to be made flexibly and without hazard to rupture or maladjustment to overrunning conditions in both directions.

Eventually, a point will be reached at which the bonnet temperature will no longer increase and thereafter begin to diminish. As a consequence, cams 31 and 32 will begin to rotate in a clockwise direction together with the other appurtenances of shaft 29. This condition is best portrayed in Fig. 9 and prevails until the rotation has progressed to a condition such as that illustrated in Fig. 10 whence the follower 70 rides off the apex 81' onto the apex 82' of cam 32.

Here again it is to be observed that the resulting motion upwardly of elements 69 and 74 does not displace the over-centering spring 76 in a clockwise direction sufficiently to cause it to perform its over-centering movement. Hence, no change obtains in the relative placement of the several contact elements, 75, 77 and 78. This intermediate stage which is now being discussed for the second time, but in a reverse direction from that which was discussed and illustrated above in connection with Fig. 8 is a region represented by the angular distance between the two settable pointers 47 and 51, which as has already been stated can be adjusted predeterminedly through the instrumentality of the clamping screws 49 and 52. Consequently, there is provided a means whereby a single cam follower is made to maintain either of two extremities of adjustment for a predetermined interval while travelling in the direction of the other extremity of adjustment.

Resuming now the sequence of operations description with the shaft 29 continuing in a clockwise direction beyond the position illustrated in Fig. 10, cam 32 eventually rides off the follower nose 70, and follower lever 65 being under tension of spring 74 arises to assume again the position indicated in Fig. 7. It is during this latter described transition that the over-centering spring 76 becomes displaced in a clockwise direction sufficiently to thrust contactor 75 back into engagement with contact point 78.

In accordance with the electrical arrangement above described, the contactors 75, 77 and 78 have been described as controlling directly the performance of a firing unit and a heat dissipating apparatus. It is to be noted that in this regard the system is illustrative but by no means inclusive of the various arrangements to which it may be applied. More specifically, these contacts may, if so desired, be made to control supervisory circuits along with or independently of room thermostates or similar apparatus. Also, these contacts may be employed for regulating the maximum and minimum temperatures of a furnace bonnet or boiler head in accordance with well-known practices and installations.

While the present invention has been explained and described in contemplation of specifically discussed embodiments and methods of operation, it is to be understood nevertheless, that numerous modifications and variations may be incorporated without departing from the essential spirit or scope thereof. Accordingly, it is not intended that the invention shall be construed within the particular language employed in the foregoing description, nor by the illustrations in the accompanying drawings, except as indicated in the hereunto appended claim.

The invention claimed is:

In a temperature responsive instrumentality for accomplishing an electrical control the combination including a spiral bimetallic element, a torque shaft secured to one end of said element for rotation in accordance with temperature fluctuations upon said element, a double-pole contactor, a spring tensioned actuator blade having an over-centering spring connection with said contactor, a cam follow lever pivoted adjacent said actuator blade, a link connecting said lever with said actuator blade, the spring tension of said blade maintaining said lever in cam following condition, a first external periphery cam adjustably carried by said shaft having a low radius periphery and a high radius periphery, a second external periphery cam having an intermediate radius periphery, and means for adjusting said cams radially of said torque shaft whereby the intermediate radius periphery of said second cam is made to subtend a predetermined angle between said low and high radius peripheries of said spring connection maintaining said contactor engaged with either of its poles last engaged during the rotation of said shaft and cams in either direction as during heat change effects on said bimetallic element.

EDGAR G. WHITE.

REFERENCES CITED

The following references are of record in the file of this patent:

UNITED STATES PATENTS

| Number | Name | Date |
|---|---|---|
| 2,233,018 | Lindemann | Feb. 25, 1941 |
| 2,237,705 | Kohl | Apr. 8, 1941 |
| 2,315,533 | Malone | Apr. 6, 1943 |
| 2,342,390 | Crum | Feb. 22, 1944 |
| 2,378,784 | Obszarny | June 19, 1945 |